United States Patent [19]
Croix

[11] 3,806,602
[45] Apr. 23, 1974

[54] INHALANT ANALGESIC AND ANESTHETIC METHOD AND COMPOSITION
[75] Inventor: Louise S. Croix, Summit, N.J.
[73] Assignee: Airco, Inc., New York, N.Y.
[22] Filed: Dec. 11, 1972
[21] Appl. No.: 314,222

[52] U.S. Cl. .......................... 424/342, 260/614 C
[51] Int. Cl. ............................................ A61k 27/00
[58] Field of Search ................. 424/342; 260/614 F

[56] References Cited
OTHER PUBLICATIONS
Chemical Abstracts 44:5236b (1950).
Chemical Abstracts 53:13042g (1959).

Primary Examiner—Jerome D. Goldberg
Attorney, Agent, or Firm—Roger M. Rathbun; H. Hume Mathews; Edmund W. Bopp

[57] ABSTRACT

The present invention relates to the novel compound difluoromethyl dichlorofluoromethyl ether ($CHF_2OCFCl_2$). The compound is prepared through selective chlorination of difluoromethyl monofluoromethyl ether. The compound is useful as an anesthetic and as a solvent and dispersant for fluorinated materials. The compound has the unusual property of causing a strong analgesic effect on mammals at light anesthetic concentrations.

3 Claims, No Drawings

INHALANT ANALGESIC AND ANESTHETIC METHOD AND COMPOSITION

This invention relates to difluoromethyl dichlorofluoromethyl ether, its preparation and its use in producing analgesia and anesthesia in anesthetic-susceptible, air-breathing mammals. This ether has the unusual property of causing strong analgesia at light anesthetic levels on such mammals.

The compound difluoromethyl dichlorofluoromethyl ether is represented by the following formula:

$$CHF_2OCFCl_2$$

This ether is normally a clear, colorless liquid with no significant odor. The compound has the following physical properties: b.p. 41°C. at 760 mm.; vapor pressure 470 mm. at 25°C.; specific gravity 1.49; and molecular weight 169. The compound is nonflammable, soda lime stable, and an analgesic and anesthetic for inhalation anesthetic-susceptible mammals.

Difluoromethyl dichlorofluoromethyl ether is readily miscible with other organic liquids including fats and oils, and has useful solvent properties, for example, as a solvent for fluorinated olefins and other fluorinated materials such as fluorowaxes. The ether can be used to prepare pastes and dispersions of such fluorine-containing materials useful for coatings and the like, and as degreasing agents.

The compound of the present invention can be prepared through the selective chlorination of difluoromethyl monofluoromethyl ether ($CHF_2OCH_2F$), according to the following equation:

$$CHF_2OCH_2F + Cl_2 \rightarrow CHF_2OCFCl_2$$

The starting material, difluoromethyl monofluoromethyl ether ($CHF_2OCH_2F$), is a well known, readily available material. The $CHF_2OCH_2F$ is photochlorinated at a temperature in the range of about 10°C. up to the boiling point, preferably at about 15° to 35°C., under an incandescent lamp or other suitable source to form difluoromethyl dichlorofluoromethyl ether ($CHF_2OCCl_2F$).

The effluent from the chlorination apparatus should be passed through a water scrubber to collect the hydrogen chloride which if formed during the reaction, and titrated with a standard base to determine the amount of HCl. In preparing $CHF_2OCCl_2F$, the chlorination should be carried out until 2 moles of HCl are detected per mole of $CHF_2OCH_2F$ reacted. The desired reaction product $CHF_2OCCl_2F$ can be readily separated from the reaction mixture by fractional distillation.

The following example illustrates the preparation of difluoromethyl dichlorofluoromethyl ether.

EXAMPLE

PREPARATION OF $CHF_2OCFCl_2$ $CHF_2OCH_2F$ (35 g., 0.35 mole) is photochlorinated following the procedure above described. The reaction is continued until 2 mole of HCl is detected per mole of $CHF_2OCH_2F$ reacted (0.70 mole). Fractional distillation of the alkali washed crude product (42 g.) yields 28 g. of above 93 percent pure $CHF_2OCFCl_2$, b.p. 41°C. Refractionation gave a 99.7 percent pure sample, b.p. 41°C., $N_D^{20}$ 1.3362, specific gravity 1.49 g./ml.

Calculated for $CHF_2OCFCl_2$: C, 14.2; H, 0.6; F, 33.7

Found: C, 13.9; H, 0.5; F, 33.8.

In order to determine the usefulness of difluoromethyl dichlorofluoromethyl ether as an inhalation anesthetic in respirable mixtures containing a life-supporting amount of oxygen, a series of tests were carried out on mice. The compound tested was at least 99.5 percent pure as determined by vapor phase chromatography.

Groups of five mice were placed in a jar and exposed to a concentration of 2.5 to 8 percent by volume of difluoromethyl dichlorofluoromethyl ether. The results of these tests were as follows:

| No. of Animals | Inhal. Conc. | Induc. Time | Recov. Time | Remarks |
|---|---|---|---|---|
| 5 | 2.5% | 4m. 12s. | Minimal analgesia, all walking in 5s. [1] | Barely anesthetic level. |
| 5 | 4% | 2m. 5s. | 6s. to walk. 10 + m. to pain. [1] | Very light anesthesia but strong analgesia. |
| 5 | 8% | 10s. | 58s. to walk. 10 + m. to pain. [1] | Quiet during maintenance. Respiration slowed. Brief cyanosis at start of recovery period. |

The compound difluoromethyl dichlorofluoromethyl ether exhibits light or low potency general anesthetic properties in inhalation anesthetic-susceptible mammals, and thus its use is particularly desirable where control over the patient is desired. The compound is unusual in giving strong analgesia lasting well into the recovery period, with only minimal general anesthesia and very rapid recovery of walking. At full general anesthesia levels it depresses respiration, although recovery is still rapid. The compound is nonflammable and soda lime stable, and lends itself well to effective use as an inhalant analgesic and anesthetic in respirable mixtures containing life-supporting concentrations of oxygen.

The effective amounts of the $CHF_2OCFCl_2$ to be employed depends upon the level of anesthesia to which the mannal is to be brought, the rate at which the anesthesia is to be induced, and the length of time over which anesthesia is to be maintained. Minor volume percentages of the ether compound of at least several percent, for example about 3 to 10 percent, preferably about 4 to 8 percent, can be used in respirable mixtures containing life-supporting amounts of oxygen. The person controlling the anesthesia can easily regulate the amount and gradually increase the amount until the desired plane of anesthesia is reached. By then monitoring the physical reactions of the mammal, as is the usual procedure, the duration and plane of anesthesia can be readily controlled. Lesser amounts of the ether compound can be employed along with oxygen where only an analgesic effect is desired.

It should be understood that the foregoing disclosure relates only to preferred embodiments of the invention and that it is intended to cover all changes and modifications of the examples of the invention herein chosen for the purpose of the disclosure which do not constitute departure from the spirit and scope of the invention.

It is claimed:

1. An inhalant analgesic and anesthetic composition comprising difluoromethyl dichlorofluoromethyl ether and oxygen is suitable proportions for use as an anesthetic or analgesic.

2. A method for effecting analgesia or anesthesia in a warm blooded, air-breathing mammal comprising administering by inhalation to said mammal an anesthetically or analgesically-effective amount of difluoromethyl dichlorofluoromethyl ether while administering life-supporting amounts of oxygen.

3. A method for effecting analgesia in a warm blooded, air-breathing mammal comprising administering by inhalation to said mammal an analgesically-effective amount of difluoromethyl dichlorofluoromethyl ether while administering life-supporting amounts of oxygen.

* * * * *

UNITED STATES PATENT OFFICE
CERTIFICATE OF CORRECTION

Patent No. 3,806,602     Dated April 23, 1974

Inventor(s) Louise S. Croix

It is certified that error appears in the above-identified patent and that said Letters Patent are hereby corrected as shown below:

Col. 1-2, in the tabulation, the footnote, as follows, should be inserted at the end of the tabulation:

-- (1) Analgesia was measured by reaction to pain caused by clipping tail. --

Col. 3, line 15, "is" should read -- in --.

Signed and sealed this 1st day of October 1974.

(SEAL)
Attest:

McCOY M. GIBSON JR.
Attesting Officer

C. MARSHALL DANN
Commissioner of Patents